United States Patent [19]

Brown et al.

[11] Patent Number: 4,790,651

[45] Date of Patent: Dec. 13, 1988

[54] TRACKING LASER INTERFEROMETER

[75] Inventors: Lawrence B. Brown, Annapolis, Md.; David N. Wells, Alexandria, Va.; J. Bradford Merry, Annapolis, Md.

[73] Assignee: Chesapeake Laser Systems, Inc., Lanham, Md.

[21] Appl. No.: 103,116

[22] Filed: Sep. 30, 1987

[51] Int. Cl.$^4$ .............................................. G01B 9/02
[52] U.S. Cl. .................. 356/4.5; 250/203 R; 356/351; 356/358; 356/363
[58] Field of Search .............. 356/4.5, 351, 358, 363, 356/138, 152; 250/203 R

[56] References Cited

U.S. PATENT DOCUMENTS

| | | | |
|---|---|---|---|
| 4,436,417 | 3/1984 | Hutchin | 356/4.5 |
| 4,457,625 | 7/1984 | Greenleaf et al. | 356/360 |
| 4,621,926 | 11/1986 | Merry et al. | 356/363 |
| 4,707,129 | 11/1987 | Hashimoto et al. | 356/363 X |
| 4,714,339 | 12/1987 | Lau et al. | 356/363 X |

*Primary Examiner*—Davis L. Willis
*Assistant Examiner*—Matthew W. Koren
*Attorney, Agent, or Firm*—Roylance, Abrams, Berdo & Goodman

[57] ABSTRACT

A system for tracking a randomly moving object using a laser beam and first and second beam steering assemblies. The steering assemblies pivot, respectively, about substantially perpendicular and intersecting X and Y axes and direct the laser beam along an R axis, which is perpendicular to the X axis and intersects the X and Y axes. Along the R axis, the laser beam is intercepted by a retroreflector, which is coupled to the moving object and which returns the laser beam to a quadrant detector via the steering assemblies. The quadrant detector generates an error signal representative of the object's movement relative to the X and Y axes, and this signal is transmitted to two motors which pivot the steering assemblies about the X and Y axes to reduce the error to zero. The system includes an interferometer to determine the distance of the object from a reference location. The first beam steering assembly includes two prisms which redirect the laser beam through three 90° reflections from an initial direction parallel to the Y axis and towards the X axis to an intermediate direction along the X axis and towards the Y axis. The second beam steering assembly includes a third prism which redirects the laser beam through one 90° reflection from the intermediate direction along the X axis to one coincident with the R axis.

27 Claims, 5 Drawing Sheets

TRACKING LASER INTERFEROMETER

The Government has rights in this invention pursuant to Contract No. N00014-85-C-2003 awarded by the Department of Defense.

FIELD OF THE INVENTION

The invention relates to a system for tracking a randomly moving object using a laser beam and first and second beam steering assemblies, which pivot, respectively, about substantially perpendicular and intersecting X and Y axes. The steering assemblies direct the laser beam along an R axis, which is perpendicular to the X axis and intersects the X and Y axes, towards a retroreflector coupled to the moving object. The system includes an interferometer to determine the distance of the object from a reference location. Advantageously, the first beam steering assembly comprises two prisms and the second beam steering assembly comprises a third prism. The system can be used to control and calibrate robotic devices, inspect large critical parts, and control machine tool operations and laser welding.

BACKGROUND OF THE INVENTION

Systems for tracking moving objects have utility in various technical fields. Thus, they can be used to control and calibrate robotic devices, inspect large critical parts such as dish antennas, air frames and propellers, and control machine tool operations and laser welding. In addition to merely tracking the moving object, these systems typically utilize distance measuring devices, such as laser interferometers, to determine the distance at any point in time of the object relative to a reference location. The precise location of the moving object in a volume is typically determined using three tracking and distance measuring devices and the well-known trilateration method. Adding additional structure can also provide the relative angle of the moving object.

While considerable work has been done in the prior art to develop these systems to a high degree of accuracy, the typical prior art systems have numerous disadvantages. One type of system utilizes gimballed flat mirrors to steer beams of radiation and servo-controlled motors to vary the angular position of the mirrors relative to the object. These gimballed mirrors, however, are accurate only to about 20-50 microns with respect to a volume of about 100 cubic meters. The accuracy of these systems is limited by bearing and shaft alignment errors, known as run out errors, and by the initial alignment error of the laser beam and the precise center of the mirror. Moreover, these gimballed mirrors afford only limited tilt angles and require frequent recalibration.

Additional systems utilize reflective pellicles which are formed from very thin reflecting membranes, the thickness being on the order of several microns. However, these pellicles are not rugged and are difficult to work with since they tend to vibrate.

Examples of these prior art systems are disclosed in the following U.S. Pat. Nos. 4,436,417 to Hutchin; 4,457,625 to Greenleaf et al; and 4,621,926 to Merry et al, the disclosures of which are hereby incorporated by reference.

Thus, there is a continuing need to provide improved tracking and distance measuring devices of high accuracy.

SUMMARY

Accordingly, a primary object of the invention is to provide a tracking laser interferometer that can track a moving object and determine its distance from a reference location with a very high degree of accuracy.

Another object of the invention is to provide a tracking laser interferometer having an accuracy of about one micron per 100 cubic meters and where cosine errors are on the order of about 0.1 micron.

A further object of the invention is to provide a tracking laser interferometer that is light, compact, portable, and rugged.

Another object of the invention is to provide a tracking laser interferometer having relatively wide tracking angles and in which the initial alignment of the laser is not acutely critical.

Another object of the invention is to provide a laser tracking system which is an improvement over single mirror systems by limiting the error introduced by initial laser misalignment and by directing the laser beam to an optical point in space defined by intersecting axes.

The foregoing objects are basically attained by providing a tracking system for continually tracking a moving object relative to a reference location, the combination comprising a retroreflector rigidly coupled to the object; a rigid stationary base positioned at the reference location; a first support; a mechanism for pivotally coupling the first support to the base for pivotal movement about a Y axis; a second support; a mechanism for pivotably coupling the second support to the first support for pivotal movement about an X axis, the X and Y axes being substantially perpendicular and intersecting at a point A; a mechanism for generating a laser beam directed along the Y axis towards point A; a first reflective assembly, rigidly coupled to the first support, for receiving the laser beam extending along the Y axis before it intersects the X axis and redirecting the laser beam along the X axis towards point A; a second reflective assembly, rigidly coupled to the second support, for (a) receiving the redirected laser beam along the X axis from the first reflective assembly and redirecting the laser beam at point A along an R axis incident on the retroreflector, and (b) receiving the laser beam reflected by the retroreflector and redirecting the laser beam substantially parallel to and generally along the X axis away from point A; the R axis being substantially perpendicular to the X axis and intersecting the X and Y axes at point A; a motive assembly, coupled to the base and the first and second supports, for pivoting, respectively, the first and second supports relative to the base; a detection mechanism, located along the path of the laser beam, for receiving the laser beam after incidence on the retroreflector and for generating an error signal representing movement of the retroreflector and object relative to the X and Y axes; and a control assembly, coupled to the motive assembly and receiving the error signal, for actuating the motive assembly to reduce the error signal to zero.

The foregoing objects are also attained by providing a method of continually tracking a moving object relative to X and Y axes which are perpendicular and intersect at a point A at a reference location, comprising the steps of rigidly coupling a retroreflector to the object, directing a laser beam along the Y axis towards the X axis, redirecting the laser beam from the Y axis, before the beam intersects the X axis, along the X axis, redirecting the laser beam from the X axis at point A along an R axis incident on the retroreflector, the R axis being substantially perpendicular to the X axis and intersecting the X and Y axes at point A, generating an error signal from the displacement of the laser beam after incidence of the laser beam on the retroreflector representing movement of the retroreflector and object relative to the X and Y axes, and relocating the R axis relative to the retroreflector and object so as to reduce the error signal to zero.

Other objects, advantages, and salient features of the invention will become apparent from the following detailed description, which, taken in conjunction with the annexed drawings, discloses preferred embodiments of the invention.

DRAWINGS

Referring now to the drawings which form a part of this original disclosure:

Figure 4:
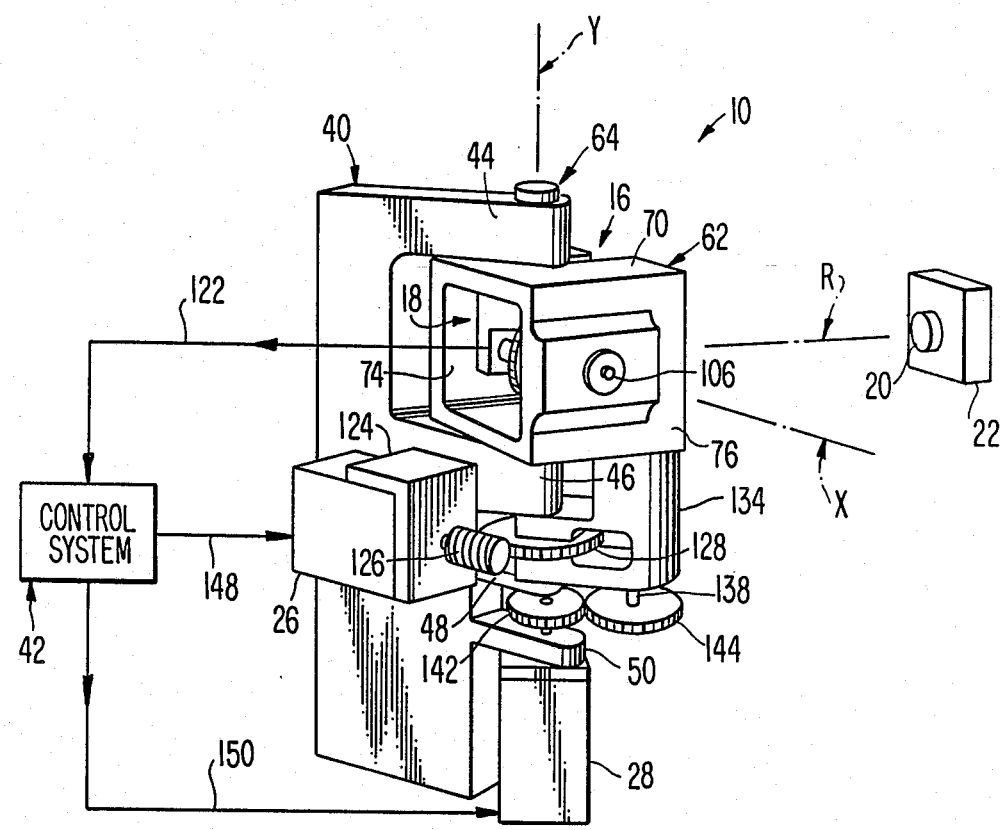
FIG. 4 is a reduced rear perspective view of the apparatus in accordance with the invention shown in FIGS. 2 and 3.
Figure 5:
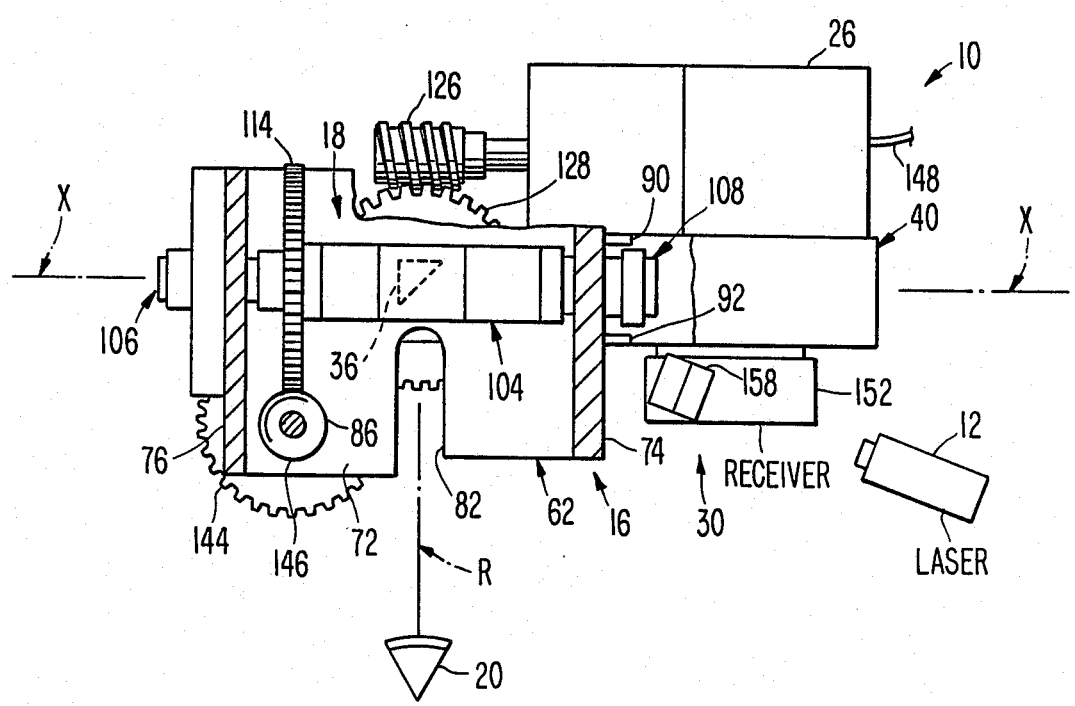
FIG. 5 is a top plan view of the apparatus shown in FIG. 2 with parts in section and broken away for clarity.
Figure 6:
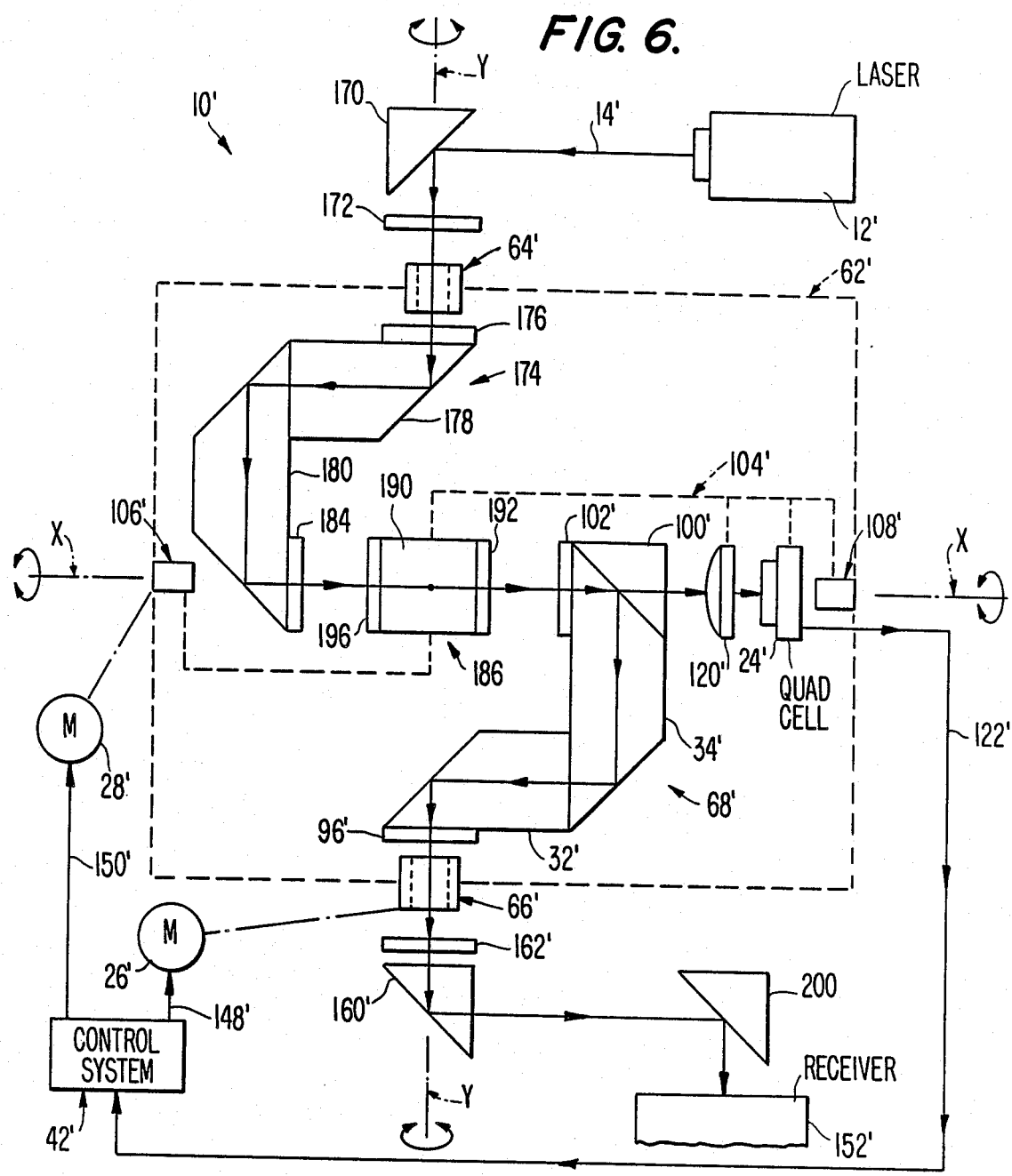
Figure 7:
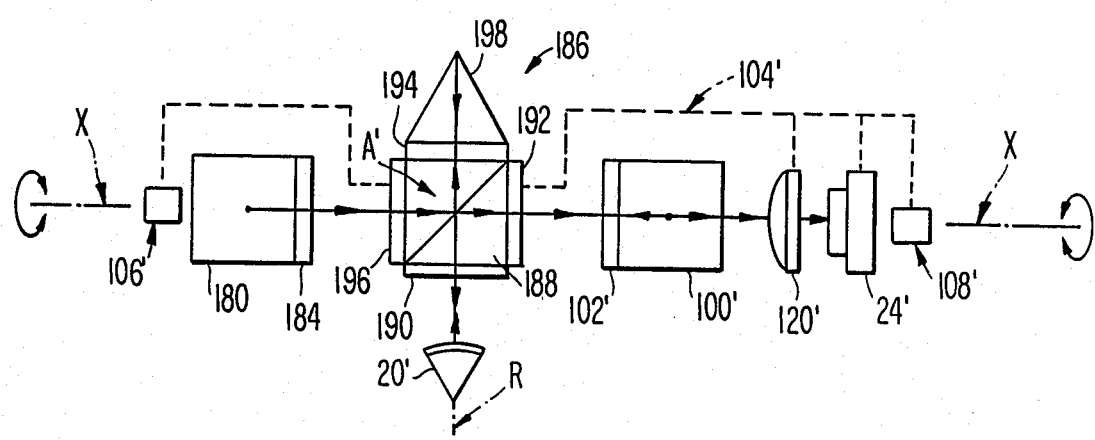

FIG. 6 is an optical schematic of a second embodiment in accordance with the invention which is similar to that shown in FIGS. 1-5 except that a third reflective assembly is utilized to conduct the laser beam to the interferometer receiver at the end of the laser beam wave path; and FIG. 7 is a top plan view of a portion of the optical schematic shown in FIG. 6 illustrating in more detail the second reflective assembly.

DETAILED DESCRIPTION OF THE INVENTION

Referring now to FIGS. 1-5, the tracking laser interferometer system 10 in accordance with the invention is intended to track a moving object and also determine its distance from a reference location.

System 10 basically comprises a laser 12 capable of generating a lser beam 14 and first and second beam steering assemblies 16 and 18. The steering assemblies 16 and 18 pivot, respectively, about substantially perpendicular and intersecting X and Y axes and direct the laser beam 14 along an R axis, which is perpendicular to the X axis and intersects the X and Y axes. Along the R axis, the laser beam is intercepted by a retroreflector 20, which is coupled to the moving object 22 (FIG. 4) and which returns the laser beam to a position sensitive photodetector 24 via the steering assemblies. The photodetector generates an error signal based on lateral displacement of the laser beam and representative of the object's movement relative to the X and Y axes, and this signal is transmitted to two motors 26 and 28 which pivot the steering assemblies about the X and Y axes to reduce the error to zero. The system 10 includes an interferometer 30 which utilizes the laser beam 14 to determine the distance of the object from a reference location.

The first beam steering assembly 16 includes two prisms 32 and 34 which redirect the laser beam 14 through three 90° reflections from an initial direction parallel to the Y axis and towards the X axis to an intermediate direction along the X axis and towards the Y axis. The second beam steering assembly 18 includes a third prism 36 which redirects the laser beam through one 90° reflection from the intermediate direction along the X axis to one coincident with the R axis where it is intercepted by the retroreflector 20 and returned to the prism 36 and then photodetector 24.

By utilizing this system 10 in which the laser beam 14 is maintained parallel to the X and Y axes, a high degree of accuracy is attained which is on the order of about one micron within 100 cubic meters. By using three of the systems, the position of the object within a volume can be accurately determined. In this case, each of these systems can be rigidly coupled to a platform. By adding a second or third retroreflector to the object and using two or three additional systems, the angular orientation of the object can also be determined.

In more comprehensive detail, as seen in FIGS. 2-5 the overall system 10 comprises a rigid stationary base 40, the first and second beam steering assemblies 16 and 18 pivotably coupled to the base, first and second servo-controlled motive assemblies including motors 26 and 28 to pivot respectively the first and second beam steering assemblies, a detection assembly comprising photodetector 24, and a control system 42 for receiving an error signal from the photodetector and providing the necessary signals for actuating motors 26 and 28.

Figure 2:
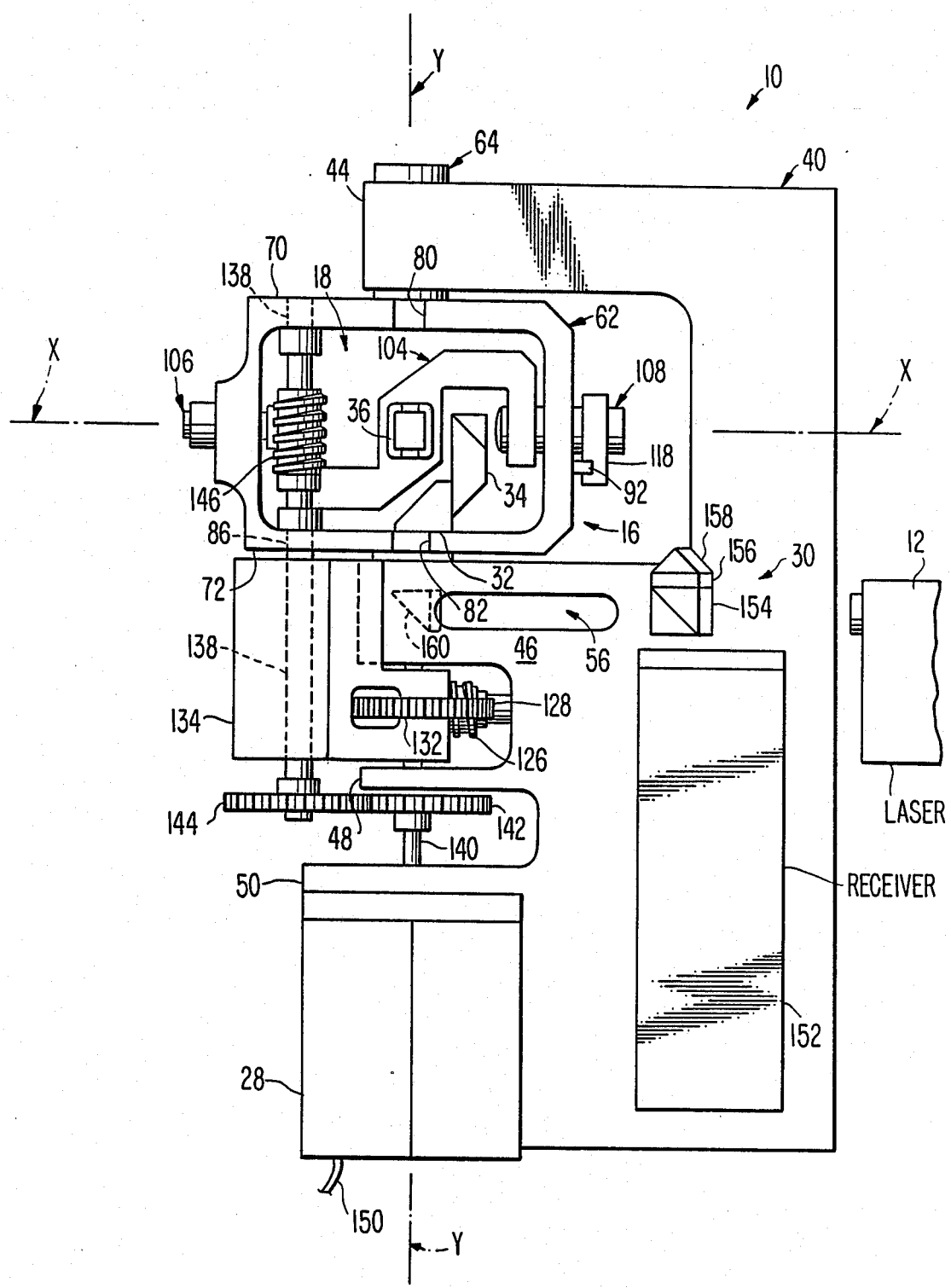
FIG. 2 is a front elevational view of an apparatus in accordance with the present invention.
Figure 3:
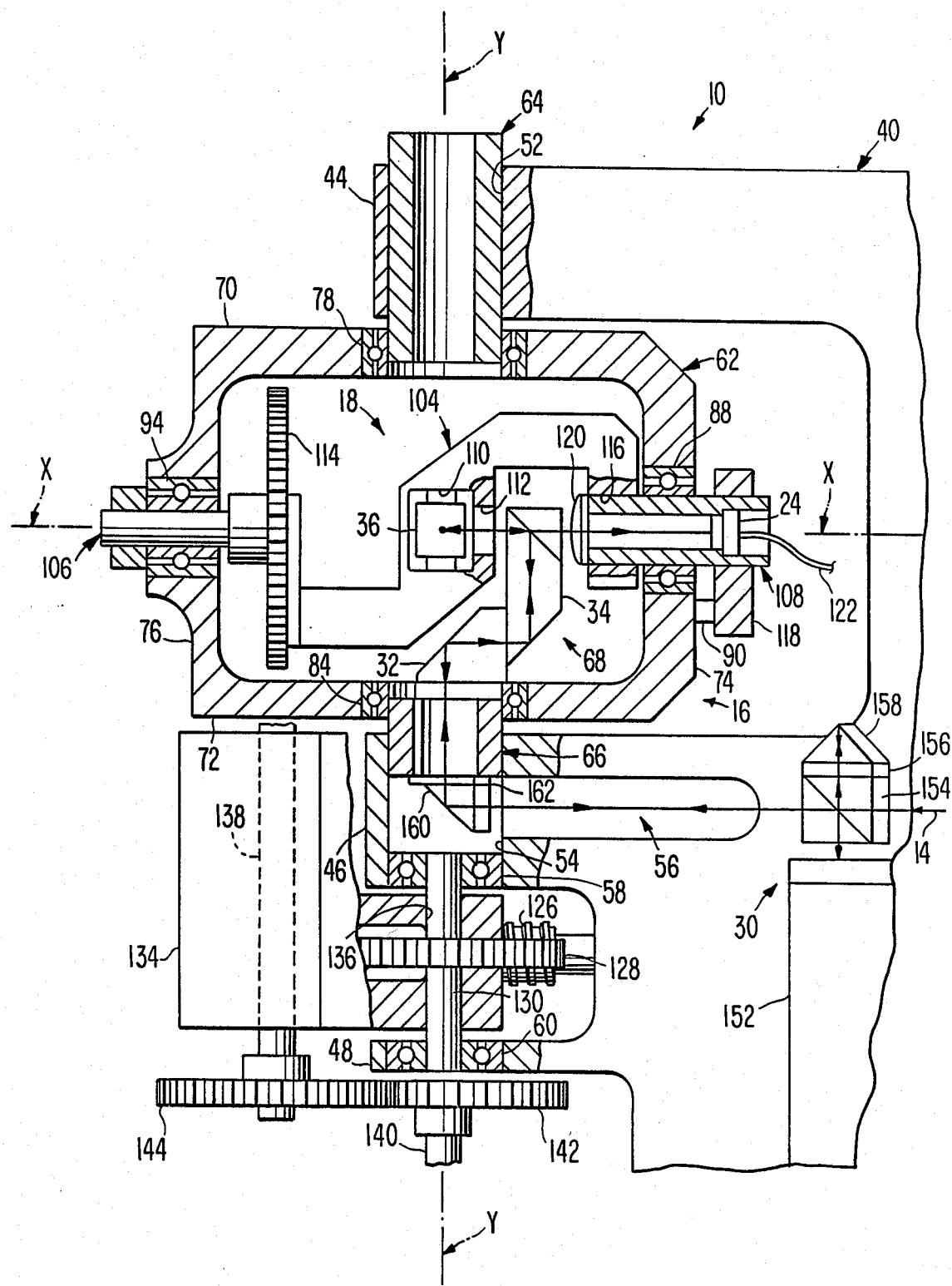
FIG. 3 is an enlarged front elevational view of the apparatus shown in FIG. 2 with parts in section and broken away.

As seen in FIGS. 2-5, the stationary base 40 forms a reference location and comprises a series of four horizontally extending vertically aligned brackets 44, 46, 48 and 50. The first bracket 44 has a vertical bore 52 coaxial with the Y axis and likewise the second bracket 46 has a vertical bore 54 which is coaxial with the Y axis. The second bracket 46 also has a horizontal passageway 56 formed in its front face and extending rearwardly as seen in FIG. 3 into communication with bore 54. A ball bearing 58 is also rigidly secured inside bore 54 and coaxial therewith.

The third bracket 48 has a suitable vertical bore located therein and rigidly receiving a ball bearing 60 which is coaxial with the Y axis. A similar bore and ball bearing, not shown, is likewise provided in the fourth bracket 50. The ball bearings are preferably coupled to the base by set screws.

The First Beam Steering Assembly

Figure 1:
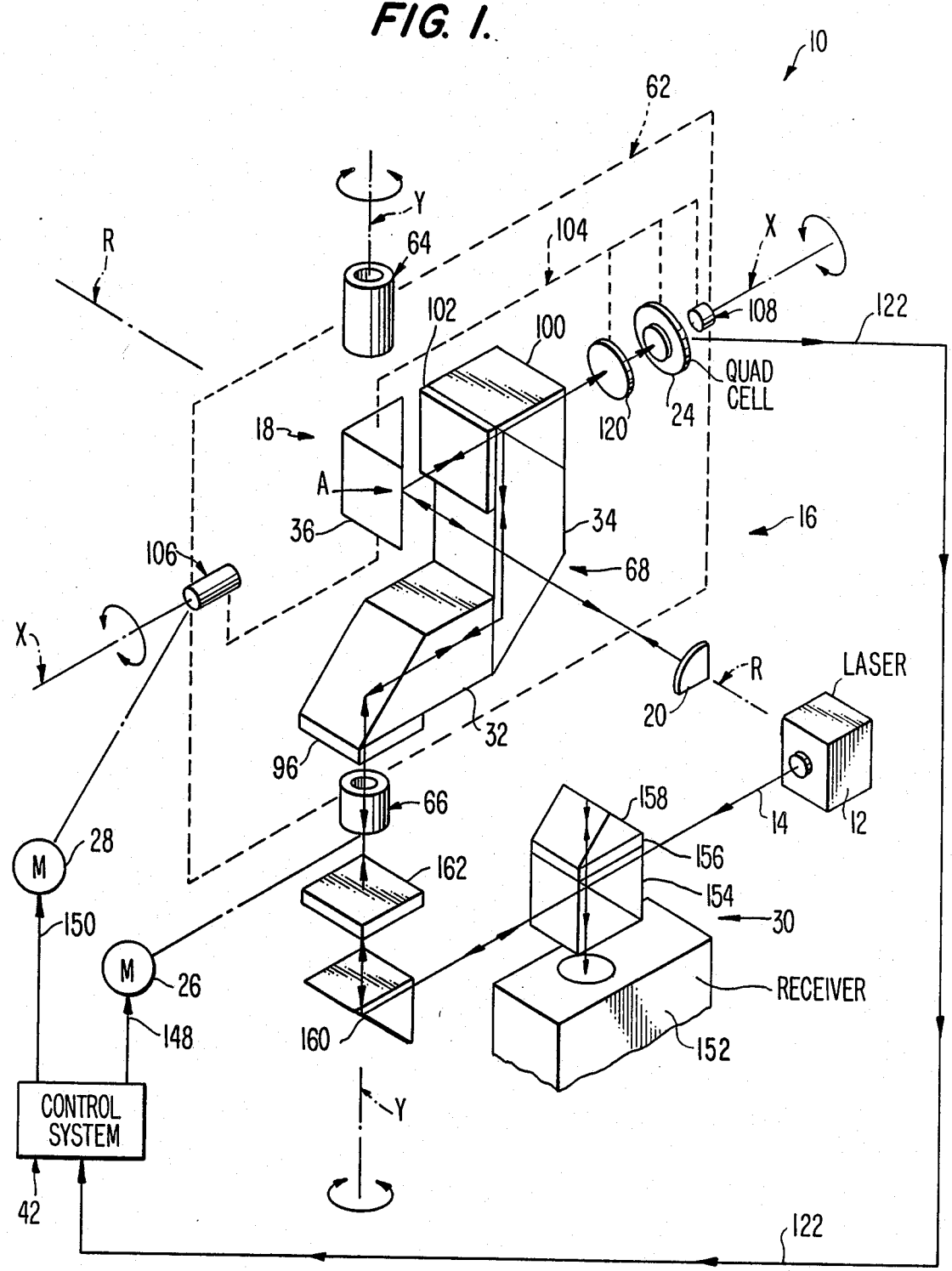
FIG. 1 is an optical schematic of the tracking laser interferometer in accordance with the invention, including a first beam steering assembly pivotable about the Y axis and a second beam steering assembly pivotable about the X axis, these axes being perpendicular and intersecting at point A from which the laser beam is directed along the R axis to a retroreflector.

As seen in FIGS. 1-3, the first beam steering assembly 16 comprises a first support 62, an upper tubular shaft 64, a lower tubular shaft 66, and a first reflective assembly 68, all of which pivot about the Y axis through about ±90°.

The first support 62 is advantageously in the form of a parallelopiped housing or case and, while not shown, can include a left and right front cover separated by a slit and a rear cover. These covers reduce the possibility of outside interference with the laser beam activity therein. The first support 62 thus comprises an upper wall 70, a lower wall 72, a right side wall 74, and a left side wall 76.

As seen in FIG. 3, the upper wall 70 has a suitable vertically oriented bore receiving ball bearing 78 rigidly therein, the inner race thereof being rigidly connected to the upper shaft 64. The upper wall 70 has an inwardly extending slot 80 therein as seen in FIG. 2 to allow the laser beam to be angled upwardly through at least 60° when the second beam steering assembly 18 is pivoted about the X axis. The lower wall 72 has a similar slot 82 as seen in FIGS. 2 and 5 to allow the laser beam to be tilted downwardly through an additional 60°. Likewise, the lower wall 72 has a suitable bore receiving rigidly therein ball bearing 84 as seen in FIG. 3. The inner race of bearing 84 is suitably rigidly coupled to and received therein the lower tubular shaft 66 as seen in FIG. 3.

The upper tubular shaft 64 is suitably rigidly coupled to bracket 44 and the lower tubular shaft 66 is suitably rigidly coupled to the second bracket 46, preferably by set screws.

Thus, the first support 62 and prisms 32 and 34 can pivot about the Y axis in a scanning action relative to shafts 64 and 66, which are coaxial with each other and the Y axis.

The lower wall 72 as seen in FIG. 2 also has a vertical bore 86 therein for the reception of a suitable bearing and a drive shaft 138 as will be described in more detail hereinafter.

The right side wall 74 has a horizontally oriented bore having a ball bearing 88 rigidly received therein and coaxial with the X axis. In addition, extending rigidly outwardly from the right wall are a pair of stop pins 90 and 92 as seen in FIGS. 2, 3 and 5, which limit the pivoting of the second beam steering assembly 18 about the X axis, as will be described in more detail hereinafter.

The left side wall 76 has a suitable horizontally oriented bore rigidly receiving therein a bearing 94 which is coaxial with the X axis.

As illustrated in FIGS. 1, 2 and 3, the first reflective assembly 68 comprises the first 45° rear surface prism 32 and the second rear surface prism 34, these prisms being rigidly coupled to the bottom wall 72 by any suitable means, such as adhesive or mechanical fasteners. The prisms 32 and 34 are aligned in a plane which receives the X and Y axes and move with support 62. While shown as a pair of prisms, these reflective members could also be three flat mirrors.

Turning to FIG. 1, the first prism 32 has a quarter wave plate 96 on its bottom for use with a polarized laser beam. The 45° angled rear surface of the prism which is intersected by the Y axis acts as a first reflector of the laser beam. The second prism 34 is rigidly coupled to prism 32 as seen in FIG. 3 by any suitable means. In addition, rigidly coupled to the top of the prism 34 is an upper coated mirrored prism 100 which combines with prism 34 to form a beam splitter, allowing about 15% light leakage therethrough towards detector 24. The upper prism 100 is coated with a polarization sensitive material. Facing the third prism 36 and rigidly coupled to the second prism 34 is a quarter wave plate 102. As seen in FIG. 1, the second prism 34 forms second and third reflectors via its upper and lower 45° angled surfaces.

The Second Beam Steering Assembly

Referring now to FIGS. 1, 2, 3 and 5, the second beam steering assembly 18 comprises a second S-shaped support or member 104, a left side shaft 106, a right side tubular shaft 108, and as a second reflective assembly, the third front surface prism 36, all of which pivot about the X axis and are supported by the first support 62.

The third prism 36 is rigidly received in the center of the second support 104 in an aperture 110 as seen in FIG. 3 and secured therein rigidly via suitable pins. Prism 36 is located so that its 45° reflective surface is at the intersection of the X and Y axes which defines point A in space about which pivoting of the supports takes place. The alignment of these axes as defined by shafts 106 and 108 and shafts 64 and 66 is as accurate as the best machining tolerances will allow. While shown as a prism, reflective member 36 can be a flat mirror or a rear surface prism. A passageway 112 extends from aperture 110 through the remaining thickness of the support 104 so that the laser beam can be reflected from the second prism 34 incident on the third prism 36 along the X axis. On the left side of the second support 104, a worm wheel 114 is rigidly secured whose axis is parallel to and coincident with the X axis. Extending to the left of the worm wheel 114 is the left side shaft 106 which is suitably rigidly coupled to the second support. On the right side of support 104 is a bore 116 rigidly receiving the right side shaft 108 therein. This shaft 108 is rotatably supported along the X axis via bearing 88, while the left side shaft 106 is rotatably supported along the X axis in bearing 94.

Thus, shafts 106 and 108 pivotaly couple support 104 and prism 36 to the first support 62 for pivotal scanning movement about the X axis.

Rigidly coupled to the right side shaft 108 exterior to the first support 62 is a control arm 118 which engages stop pins 90 and 92 upon pivotal motion of the second beam steering assembly 18 to limit the pivotal movement about the X axis to about ±60°.

The position sensitive photodetector 24 seen in FIGS. 1 and 3 is rigidly supported inside right side shaft 108 and is aligned with the X axis. Adjacent prism 34 and on the inner end of shaft 108 is a plano-convex lens 120 for focusing the laser beam on the photodetector 24. This photodetetor comprises a detection assembly and is advantageously in the form of a quadrant detector, also known as a quad cell. Extending from the photodetector 24 is an output line 122 which provides an error signal to the control system 42 as seen in FIG. 1.

Referring to FIGS. 1, 4 and 5, a first motive assembly is formed from a first D.C. motor 26 which as seen in Figs. 4 and 5 is rigidly coupled to the rear of base 40 via bracket 124. Motor 26 rotates in either direction a worm gear 126 which in turn rotates a horizontally oriented worm wheel 128. Wheel 128 is rigidly coupled to a vertical first drive shaft 130 and is rigidly received in a horizontal slot 132 in a movable bracket 134. Movable bracket 135 has a vertical bore 136 for the rigid reception of first drive shaft 130 about which it pivots. Drive shaft 130 is suitably pivotally supported in brackets 46 and 48.

Rotatably received in bracket 134 and vertically oriented is a second drive shaft 138 which is suitably supported in suitable bearings therein. This shaft 138 as seen in FIGS. 2 and 3 extends upwardly through the lower wall 72 in the first support 62 via vore 86 and is rotatably received in a suitable bore and bearing in the upper wall 70 of the first support 62. Since the second drive shaft 138 can only rotate relative to bracket 134 and does not move vertically, pivotal movement of bracket 134 under the influence of worm wheel 128 and worm gear 126, via motor 26, causes pivotal movement of the first support 62 about the Y axis and tubular shafts 64 and 66.

The second motive assembly for pivoting the second beam steering assembly 18 about the X axis comprises the second D.C. motor 28 which is rigidly coupled to the fourth bracket 50 on the base. This motor rotates, in either direction via third drive shaft 140, a horizontally oriented spur gear 142 which meshes with a second horizontally oriented spur gear 144. This spur gear 144 is rigidly coupled to the bottom of the second drive shaft 138 and rotates a second worm gear 146 which is located as seen in FIGS. 1 and 5 inside the first support 62 and threadedly engages the vertically oriented worm wheel 114. Thus, rotation of worm gear 146 in either direction provides pivotal movement to the second beam steering assembly 18 via spur gear 144. This pivotal movement is about the X axis and is supported by shafts 106 and 108. By locating the second motor on the base, not the first support, any heat from the motor is isolated from the optical components. Moreover, the weight of the first support is kept low so that it can more efficiently be pivoted in either direction. Even though bracket 134 is connected to both wheel 128 and gear 144, movement of wheel 128 does not necessarily actuate worm gear 146 since gear 144 can walk around gear 142.

As seen in FIGS. 1 and 4, the control system 42 has a first output line 148 connected with the first motor 26 and a second output line 150 connected to the second motor 28. The control system is a conventional device that will take the error signal from the photodetector 24 and energize the first and second motors 26 and 28 to rotate in the appropriate directions and for the appropriate amount of time in order to reduce the error signal to zero. This control system basically includes a digital computer with the necessary logic.

The laser 12 utilized as the source of the laser beam 14 is advantageously capable of producing a dual mode polarized beam since this is less sensitive to turbulence in the air. Using such a dual mode polarized beam necessitates the use of the quarter wave plates. However, they can be eliminated with use of different types of lasers and interferometers. The wave plates are inserted between the pivoting parts of the optical elements in the system and the stationary ones. These wave plates convert linear polarization to circular polarization so that the effect of the pivoting is nil.

The interferometer 30 seen in FIGS. 1, 2, 3 and 5, comprises a receiver, or fringe counter, 152, a beam splitter 154, a quarter wave plate 156 and a corner cube 158. These elements forming the interferometer are rigidly coupled to the side of the base in a position where the beam splitter 154 intercepts the laser beam 14 and the receiver 152 intercepts the laser beam as reflected via the corner cube 158 from the beam steering assemblies.

In order to transmit the laser beam 14 from the beam splitter 154 and in a direction parallel with the Y axis and towards the x axis, a beam guiding 45° rear surface prism 160, as seen in FIGS. 1, 2 3, is rigidly located inside bore 54 in the second bracket in the base in direct communication with the open passageway 56 and aligned with the Y axis. A quarter wave plate, shown in FIG. 1, is also rigidly coupled in the base adjacent the prism 160. The prism 160 and quarter wave plate 162 are suitably rigidly supported inside the base in bore 54 in alignment with the beam splitter 154 in any suitable fashion. Advantageously, they can be adhered to the bottom of the lower tubular shaft 66 as illustrated in FIG. 3.

The retroreflector 20 seen in FIGS. 1, 4 and 5, is advantageously a retrosphere, but also may be a corner cube, and is rigidly coupled to the object 22. This object 22 can be for example a robot arm, a non-contact optical probe, a cutting tool, or a welding tool. The retroreflector 20 receives the laser beam 14 as it is reflected from prism 36 along the R axis and in turn reflects the laser beam back to prism 36. This R axis is perpendicular to the X axis, intersects with the X and Y axes at point A seen in FIG. 1, and varies angularly relative to the Y axis as the retroreflector moves.

Operation

In operation, as seen best in FIG. 1, the laser 12 is energized, thereby generating laser beam 14 which is intercepted along the beam path by beam splitter 154. This causes a portion of the laser beam to be reflected upwardly through the quarter wave plate 156 and into the corner cube 158 where the laser beam is reflected downwardly through the quarter wave plate and the beam splitter as a reference beam and into the receiver 152.

The other portion of the beam 14 continues onwardly through the beam splitter to prism 160 where it is reflected 90° upwardly through quarter wave plate 162 and tubular shaft 66 in a direction towards the X axis and substantially coincident with the Y axis.

The laser beam 14 continues through the quarter wave plate 96 and is reflected 90° via the first prism 32 into a direction parallel to the X axis and away from the Y axis. Next, the laser beam 14 is reflected 90° by the lower angled surface of the second prism 34 upwardly in a direction parallel with the Y axis and towards the X axis where it is again reflected 90° by the upper angled surface of prism 34. The beam is reflected in a direction towards the Y axis and point A along a line substantially coincident with the X axis. The beam passes through the quarter wave plate 102 and then is reflected 90° by the third prism 36 in the second beam steering assembly 18 and outward therefrom along the R axis, which is perpendicular to the X axis and extends from point A.

Along the R axis, the laser beam 14 is intercepted by the retroreflector 20 coupled to the object 22 and the beam is retro-reflected back to prism 36 where it is reflected 90° into a direction generally along the X axis. As the retroreflector moves, the laser beam reflected generally along the X axis is laterally offset, but substantially prallel to the X axis.

The beam then passes through the quarter wave plate 102 and through the beam splitter formed by prism 34 and prism 100 with a portion of the beam extending through prism 100 to the plano-convex lens 120 where it is focused on the quad cell 24.

If the beam 14 is perfectly aligned with the X axis and the center of the quad cell, no error signal will be sent. However, if there is some lateral displacement, then the quad cell 24 generates a suitable error signal and transmits it along output line 122 to the control system 42. The control system in turn will energize motors 26 and 28 as necessary to pivot the first beam steering assembly 16 about the Y axis, the second beam steering assembly 18 about the X axis, or both, in the necessary directions in order to reduce the error signal to zero. This generation of an error signal and compensation by the motors continues as the retroreflector 20 moves relative to the X and Y axes. In essence, the activity of the motors tends to relocate the R axis so that the error is reduced to zero.

Returning to the prisms 34 and 100, the other portion of the laser beam 14 not transmitted to the quad cell is reflected downwardly 90° from a direction generally along the X axis to one which is substantially parallel to the Y axis and away from the X axis. This portion of the beam is then reflected 90° towards the Y axis and substantially parallel to the X axis via the lower angled surface of prism 34 and is intercepted by the first prism 32. This prism reflects this portion of the beam downwardly generally along and substantially parallel to the Y axis, through the lower tubular shaft 66, through the quarter wave plate 162 and incident on the beam guiding prism 160. This prism reflects the beam 90° back to beam splitter 154 where this portion of the beam is reflected 90° downwardly into the receiver 152. By comparing the reference beam from the corner cube 158 and the portion of the beam returning from the retroreflector 20, the receiver via fringe counting can determine the distance of the retroreflector therefrom.

As is evident from FIG. 1, the first beam steering assembly 16 comprising prisms 32 and 34 can be pivoted about the Y axis on shafts 64 and 66 through about ±90°. In addition, the second beam steering assembly 18 comprising the third prism 36, lens 120 and quad cell 24 can be pivoted about the X axis via shafts 106 and 108, which are pivotally coupled to the first support 62. The pivotal movement about the X axis is through about ±60°.

By using this structure, a highly accurate tracking laser interferometer system results which is light, compact, portable and rugged and provides wide tracking angles. Moreover, the system does not rely upon initial laser alignment which can be off by several tenths of a millimeter. In addition, the overall system reduces cosine errors to about 0.1 micron and is accurate to about one micron within a volume of 100 cubic meters. Cosine error means the laser beam path difference between a beam that goes to the center of the retroreflector and one that deviates from that path by $d\theta$. The path length difference is $dL = L(1 - \cos d\theta)$ which is substantially equal to $L\, d\theta^2/2$.

Embodiment of FIGS. 6 and 7

As seen in FIGS. 6 and 7, a second embodiment of the present invention is shown as tracking laser interferometer system 10'. This system 10' is similar to that shown in FIGS. 1-5 and discussed above and utilizes many of the same components. These same components are illustrated schematically in FIGS. 6 and 7 and are given similar reference numerals with the addition of a prime. However, additional structure is added for the main purpose of eliminating dead path error by eliminating the return of the laser beam from the second steering beam assembly along its initial wave path to the interferometer. Instead, there is one continuous wave path with the receiver of the interferometer being at the end of the overall wave path. Dead path error is any change in the laser beam path length between the interferometer beam splitter and the last beam steering optical element of the tracking system. Thus, any change in this path length while the system is tracking introduces such a dead path error.

The additional structure added to system 10' shown in FIGS. 6 and 7 begins with prism 170 located above and coupled to upper tubular shaft 64' and quarter wave plate 172 therebetween. Below shaft 64' is a third reflective assembly 174 which is similar to and acts as the first reflective assembly 68 described above except it does not have an additional prism 100 forming a beam splitter. Thus, this third reflective assembly 174 comprises a quarter wave plate 176, a first prism 178, which is similar to prism 32 discussed above, a second prism 180, which is similar to prism 34 discussed above, and quarter wave plate 184. This third reflective assembly 174 is rigidly coupled to the first support 62' and pivots with it about the Y axis defined by shaft 64' and 66'.

The second reflective assembly 186 in this embodiment is different from the second reflective assembly 18 in the embodiment of FIGS. 1-5 and comprises as seen in FIGS. 6 and 7 a beam splitter 188, four quarter wave plates 190, 192, 194 and 196 affixed to its four sides, and a corner cube retroreflector 198 rigidly coupled to quarter wave plate 194 on the rear of the assembly. This second reflective assembly 186 is rigidly coupled to the second support 104' and pivots with it about the X axis and shafts 106' and 108' together with lens 120' and quad cell 24'.

The final piece of additional structure in the embodiment of FIGS. 6 and 7 is the prism 200 located adjacent the receiver 152' and aligned with beam guiding prism 160'.

In operation, system 10' generates a laser beam 14' from laser 12' which is intercepted by prism 170 and is redirected 90° substantially coincident with the Y axis and towards the X axis. The beam then passes through quarter wave plate 172, tubular shaft 64', and quarter wave plate 176, at which time it is intercepted by prism 178. This prism reflects the laser beam 90° away from the Y axis and parallel to the X axis where it is intercepted by the upper angled surface of second prism 180. At that time, the laser beam is again reflected 90° in a direction towards the X axis and parallel to the Y axis and it is then reflected again through 90° by the lower angled surface of prism 180 in a direction substantially coincident with the X axis and towards the beam splitter 188.

A portion of the laser beam, as seen in FIG. 7, is then reflected by the beam splitter 188 at point A' in a rearward direction away from the X axis and along the R axis where it passes through quarter wave plate 194 and is intercepted by corner cube retroreflector 198. This portion of the beam is then reflected back through the quarter wave plate 194, beam splitter 188 and quarter wave plate 190 along the R axis and is intercepted by the retroreflector 20'. The retroreflector then reflects the laser beam back through the beam splitter 188 where it is reflected generally along and substantially parallel or coincident with the X axis through quarter wave plates 192 and 102', a beam splitter formed by prisms 34' and 100' and through lens 102' into the quad cell 24', which generates an error signal if the beam is laterally displaced from the X axis. This error signal, as in the embodiment of FIGS. 1-5, is conducted via line 122' to the control system 42' where motors 26' and 28' are actuated as necessary to pivot the first, second, and third beam, steering assemblies 68', 174 and 186 to reduce the error signal to zero.

Meanwhile, the other portion of the laser beam not reflected into corner cube retroreflector 198 has continued through beam splitter 188, quarter wave plate 192 and through quarter wave plate 102', where at least a portion of it is reflected downwardly via the upper angled surface of prism 34' in a direction substantially parallel to the Y axis and away from the X axis. This portion of the laser beam is then reflected through 90° via the lower angled surface of prism 34', reflected again through 90° via prism 32', and extends downwardly generally along the Y axis through quarter wave plate 96', tubular shaft 66', quarter wave plate 162' and is intercepted by guiding prism 160'. This prism reflects this portion of the laser beam towards the prism 200 which finally reflects that portion of the beam into the receiver 152'.

Since beam splitter 188 divides the initial laser beam into two portions, one which extends to and is returned from the retroreflector 20', and another which continues on to the receiver 152', these two portions of the laser beam can be measured by the receiver to determine the distance of the retroreflector from the reference location.

While the embodiment of FIGS. 6 and 7 adds additional structure and cost to the system, it does indeed eliminate the dead path error and is therefore more accurate than the embodiment of FIGS. 1-5.

While various advantageous embodiments have been chosen to illustrate the invention, it will be understood by those skilled in the art that various changes and modifications can be made therein without departing from the scope of the invention as defined in the appended claims. For example, the photodetectors 24 and 24' need not be located as shown in FIGS. 1-5 and FIGS. 6 and 7. Instead, in both embodiments a photodetector can be located along the beam path behind and rigidly coupled to the retroreflector or behind and rigidly coupled to prism 36 or beam splitter 188. If the photodetector is positioned in these alternative locations, the corresponding optical element would be constructed so as to pass a portion of the laser beam therethrough to the photodetector.

What is claimed is:

1. A tracking system for continually tracking a moving object relative to a reference location, the combination comprising:
    a retroreflector rigidly coupled to the object;
    a rigid stationary base positioned at the reference location;
    a first support;
    means for pivotally coupling said first support to said base for pivotal movement about a Y axis;
    a second support;
    means for pivotally coupling said second support to said first support for pivotal movement about an X axis, said X and Y axes being substantially perpendicular and intersecting at a point A;
    means for generating a laser beam directed along said Y axis towards point A;
    first reflective means, rigidly coupled to said first support, for receiving the laser beam extending along said Y axis before it intersects the X axis and redirecting the laser beam along said X axis towards point A;
    second reflective means, rigidly coupled to said second support, for
    (a) receiving the redirected laser beam along said X axis from said first reflective means and redirecting the laser beam at point A along an R axis indicent on said retroreflector, and
    (b) receiving the laser beam reflected by said retroreflector and redirecting the laser beam substantially parallel to and generally along said X axis away from point A;
    said R axis being substantially perpendicular to said X axis and intersecting said X and Y axes at said point A;
    motive means, coupled to said base and said first and second supports, for pivoting, respectively, said first and second supports relative to said base;
    detection means, located along the path of the laser beam, for receiving the laser beam after incidence on said retroreflector and for generating an error signal representing movement of said retroreflector and object relative to said X and Y axes; and
    control means, coupled to said motive means and receiving said error signal, for actuating said motive means to reduce said error signal to zero.

2. A tracking system according to claim 1, and further comprising
    inteferometer means, coupled to said base and receiving the laser beam from said means for generating a laser beam and receiving a portion of the retroreflected laser beam from said second reflective means via said first reflective means, for determining the distance of said retroreflector and object from the reference location;
    said first reflective means including means for redirecting a portion of the retro-reflected laser beam from said second reflective means to said interferometer means.

3. A tracking system according to claim 1, wherein said first reflective means comprises
    a first reflector for reflecting the incident laser beam extending along said Y axis in a direction substantially parallel to said X axis and away from said Y axis,
    a second reflector for reflecting the incident laser beam received from said first reflector in a direction substantially parallel to said Y axis and towards said X axis, and
    a third reflector for reflecting the incident laser beam received from said second reflector in a direction substantially parallel to and substantially coincident with said X axis.

4. A tracking system according to claim 3, wherein said Y axis intersects said first reflector.

5. A tracking system according to claim 4, wherein said X axis intersects said third reflector.

6. A tracking system according to claim 3, wherein said X axis intersects said third reflector.

7. A tracking system according to claim 1, wherein said second reflective means comprises a front surface reflector.

8. A tracking system according to claim 1, wherein said means for pivotally coupling said first support to said base has a range of about ±90°, and
said means for pivotally coupling said second support to said first support has a range of about ±60°.

9. A tracking system according to claim 1, wherein said first support comprises a hollow housing.

10. A tracking system according to claim 9, wherein said second support comprises a substantially S-shaped member.

11. A tracking system according to claim 1, wherein said second support comprises a substantially S-shaped member.

12. A tracking system according to claim 1, wherein said detection means comprises a quadrant detector.

13. A tracking system according to claim 1, wherein said first support includes means for supporting said detection means on said first support in a position intersected by said X axis.

14. A tracking system according to claim 13, wherein said means for supporting said detection means comprises a tubular shaft.

15. A tracking system according to claim 14, wherein said tubular shaft is rigidly coupled to said detection means and said means for supporting further comprises means for pivotably coupling said tubular shaft to said first support.

16. A tracking system according to claim 1, wherein said means for pivotally coupling said first support to said base comprises a tubular shaft through which said laser beam passes.

17. A tracking system according to claim 1, wherein said means for generating a laser beam directed along said Y axis comprises a reflector rigidly coupled to said base and intersected by said Y axis.

18. A tracking system according to claim 1, and further comprising
third reflective means, rigidly coupled to said first support, for redirecting a portion of the retroreflected laser beam from said second reflective means along said Y axis, and
interferometer means, coupled to said base and receiving the laser beam from said third reflective means, for determining the distance of said retroreflector and object from the reference location.

19. A tracking system according to claim 1, wherein said motive means comprises
first and second motors,
means for rigidly mounting each of said motors to said base,
first means for transmitting motive power from said first motor to said first support, and
second means for transmitting motive power from said second motor to said second support.

20. A method of continually tracking a moving object relative to X and Y axes which are perpendicular and intersect at a point A at a reference location, comprising the steps of
rigidly coupling a retroreflector to the object,
directing a laser beam along the Y axis towards the X axis,
redirecting the laser beam from the Y axis, before the beam intersects the X axis, along the X axis,
redirecting the laser beam from the X axis at point A along an R axis incident on the retroreflector, the R axis being substantially perpendicular to the X axis and intersecting the X and Y axes at point A,
generating an error signal from the displacement of the laser beam after incidence of the laser beam on the retroreflector representing movement of the retroreflector and object relative to the X and Y axes, and
relocating the R axis relativ to the retroreflector and object so as to reduce the error signal to zero.

21. A method according to claim 20, and further comprising the step of
determining the distance of the retroreflector and object relative to the reference location.

22. A method according to claim 20, wherein the relocating step comprises the steps of
relocating the R axis within a range of about ±60° about the X axis, and
relocating the R axis within a range of about ±90° about the Y axis.

23. A method according to claim 20, wherein the step of redirecting the laser beam from the Y axis along the X axis comprises the steps of
reflecting the laser beam extending along the Y axis in a direction substantially parallel to the X axis and away from the Y axis,
reflecting the laser beam substantially parallel to the Y axis and towards the X axis, and
reflecting the laser beam substantially parallel to and substantially coincident with the X axis.

24. A tracking system for continually tracking a moving object relative to a reference location, the combination comprising:
a retroreflector rigidly coupled to the object;
a rigid stationary base positioned at the reference location;
a first support;
means for pivotally coupling said first support to said base for pivotal movement about a Y axis;
a second support;
means for pivotally coupling said second support to said first support for pivotal movement about an X axis, said X and Y axes being substantially perpendicular and intersecting at a point A;
means for generating a laser beam directed along said Y axis towards point A;
first reflective means, rigidly coupled to said first support, for receiving the laser beam extending along said Y axis before it intersects the X axis and redirecting the laser beam along said X axis towards point A;
second reflective means, rigidly coupled to said second support, for receiving the redirected laser beam along said X axis from said first reflective means and redirecting the laser beam at point A along an R axis incident on said retroreflector;
said R axis being substantially perpendicular to said X axis and intersecting said X and Y axes at said point A;
motive means, coupled to said base and said first and second supports, for pivoting, respectively, said first and second supports relative to said base;
detection means, located along the path of the laser beam, for receiving the laser beam after incidence on said retroreflector and for generating an error signal representing movement of said retroreflector and object relative to said X and Y axes; and
control means, coupled to said motive means and receiving said error signal, for actuating said motive means to reduce said error signal to zero.

25. A tracking system according to claim 24, wherein said second reflective means further includes means for receiving the laser beam reflected by said retroreflector.

26. A tracking system according to claim 25, and further comprising
interfermeter means, coupled to said base and receiving the laser beam from said means for generating a laser beam and receiving a portion of the retroreflected laser beam from said second reflective means via said first reflective means, for determining the distance of said retroreflector and object from the reference locatioon;
said first reflective means including means for redirecting a portion of the retro-reflected laser beam from said second reflective means to said interferometer means.

27. A tracking system according to claim 24, wherein said first reflective means comprises
a first reflector for reflecting the incident laser beam extending along said Y axis in a direction substantially parallel to said X axis and away from said Y axis,
a second reflector for reflecting the incident laser beam received from said first reflector in a direction substantially parallel to said Y axis and towards said X axis, and
a third reflector for reflecting the incident laser beam received from said second reflector in a direction substantially parallel to and substantially coincident with said X axis.

* * * * *

UNITED STATES PATENT AND TRADEMARK OFFICE
CERTIFICATE OF CORRECTION

PATENT NO. : 4,790,651

DATED : December 13, 1988

INVENTOR(S) : Lawrence B. Brown, David N. Wells, J. Bradford Merry

It is certified that error appears in the above—identified patent and that said Letters Patent is hereby corrected as shown below:

Claim 1, column 11, line 64, delete "indicent" and insert -- incident --.

Claim 2, column 12, line 17, delete "inteferometer" and insert -- interferometer --.

Claim 20, column 13, line 57, delete "relativ" and insert -- relative --.

Claim 26, column 14, line 57, delete "interfermeter" and insert -- interferometer --.

Claim 26, column 14, line 63, delete "locatioon" and insert -- location --.

Signed and Sealed this

Twenty-fifth Day of April, 1989

*Attest:*

DONALD J. QUIGG

*Attesting Officer*      *Commissioner of Patents and Trademarks*